United States Patent
Zhou et al.

(10) Patent No.: US 11,770,718 B2
(45) Date of Patent: Sep. 26, 2023

(54) UNLICENSED CHANNEL SHARING METHOD AND DEVICE, STORAGE MEDIUM, TERMINAL AND BASE STATION

(71) Applicant: BEIJING UNISOC COMMUNICATIONS TECHNOLOGY CO., LTD., Beijing (CN)

(72) Inventors: Huan Zhou, Pudong (CN); Huayu Zhou, Pudong (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 361 days.

(21) Appl. No.: 17/258,383

(22) PCT Filed: May 30, 2019

(86) PCT No.: PCT/CN2019/089201
§ 371 (c)(1),
(2) Date: Jan. 6, 2021

(87) PCT Pub. No.: WO2020/007142
PCT Pub. Date: Jan. 9, 2020

(65) Prior Publication Data
US 2021/0297869 A1    Sep. 23, 2021

(30) Foreign Application Priority Data
Jul. 6, 2018   (CN) .......................... 201810736266.0

(51) Int. Cl.
H04W 16/14    (2009.01)
H04W 72/04    (2023.01)
(Continued)

(52) U.S. Cl.
CPC ....... *H04W 16/14* (2013.01); *H04W 72/0446* (2013.01); *H04W 72/21* (2023.01); *H04W 74/0816* (2013.01)

(58) Field of Classification Search
CPC ............. H04W 72/0446; H04W 16/14; H04W 74/0816; H04W 72/21; H04W 74/0808
See application file for complete search history.

(56) References Cited

U.S. PATENT DOCUMENTS 10,834,601 B2    11/2020   Wu et al.
10,887,912 B2     1/2021   Kim et al.
(Continued)

FOREIGN PATENT DOCUMENTS

CN    105207754 A    12/2015
CN    105230102 A     1/2016
(Continued)

OTHER PUBLICATIONS

First Chinese Office Action regarding Application No. CN201810736266.0. Translation provided by Unitalen Attorneys at Law.
(Continued)

*Primary Examiner* — Brian D Nguyen
(74) *Attorney, Agent, or Firm* — Harness, Dickey & Pierce, P.L.C.

(57) ABSTRACT

An unlicensed channel sharing method and device, a storage medium, a terminal and a base station, the sharing method comprising: determining channel sharing information, the channel sharing information comprising time slot specification information which may allow a network to access and occupy a channel occupation time of an unlicensed channel; and sending the channel sharing information to the network. By means of employing the technical solution of the present invention, a UE may notify a base station of an unlicensed
(Continued)

determining a channel sharing information, wherein the channel sharing information comprises a slot format information of COT that is available for a network to access and occupy an unlicensed channel ⸺ S101 sending the channel sharing information to the network ⸺ S102 channel occupation duration so that the UE effectively carries out channel sharing with the base station.

18 Claims, 5 Drawing Sheets

(51) Int. Cl.
*H04W 74/08* (2009.01)
*H04W 72/0446* (2023.01)
*H04W 72/21* (2023.01)

(56) References Cited

U.S. PATENT DOCUMENTS

| | | |
|---|---|---|
| 11,057,872 B2 | 7/2021 | Si et al. |
| 11,457,442 B2* | 9/2022 | Tang ..................... H04L 5/0094 |
| 2016/0227425 A1 | 8/2016 | Kim et al. |
| 2017/0048879 A1 | 2/2017 | Zhang et al. |
| 2017/0195888 A1 | 7/2017 | Gou et al. |
| 2018/0054822 A1 | 2/2018 | Kim et al. |
| 2018/0295004 A1 | 10/2018 | Gou et al. |
| 2018/0324604 A1* | 11/2018 | Yang ..................... H04W 24/02 |
| 2019/0037411 A1 | 1/2019 | Wu et al. |
| 2019/0342915 A1 | 11/2019 | Kim et al. |
| 2019/0380064 A1* | 12/2019 | Salem ................... H04W 28/16 |
| 2020/0170004 A1 | 5/2020 | Si et al. |
| 2020/0229231 A1* | 7/2020 | Oh ........................ H04W 80/08 |
| 2021/0045042 A1* | 2/2021 | Nakashima ........... H04W 72/23 |
| 2021/0092768 A1 | 3/2021 | Kim et al. |
| 2021/0218502 A1* | 7/2021 | Park ..................... H04L 5/0005 |
| 2021/0274549 A1* | 9/2021 | Park .................. H04W 74/0808 |
| 2021/0329696 A1* | 10/2021 | Novlan ................. H04W 72/21 |
| 2021/0367743 A1* | 11/2021 | Kim ..................... H04L 5/0098 |

FOREIGN PATENT DOCUMENTS

| | | |
|---|---|---|
| CN | 105636178 A | 6/2016 |
| CN | 105722222 A | 6/2016 |
| CN | 105828448 A | 8/2016 |
| CN | 106162898 A | 11/2016 |
| CN | 106301734 A | 1/2017 |
| CN | 107041000 A | 8/2017 |
| CN | 107182126 A | 9/2017 |
| CN | 107889114 A | 4/2018 |
| EP | 3240223 A1 | 11/2017 |
| EP | 3429287 A1 | 1/2019 |
| WO | WO-2016049850 A1 | 4/2016 |
| WO | WO-2017126935 A1 | 7/2017 |
| WO | WO-2017166212 A1 | 10/2017 |
| WO | WO-2018-106429 A1 | 6/2018 |

OTHER PUBLICATIONS

Extended European Search Report regarding Application No. 19830195.4 dated Feb. 28, 2022.
Second Chinese Office Action regarding Application No. 201810736266.0 dated Jan. 6, 2022. English translation provided by Unitalen Attorneys at Law.
"On NR-Unlicensed Frame Structure", 3rd Generation Partnership Project, Busan, Korea, May 12, 2018.
"NR Frame Structure on Unlicensed Bands", 3rd Generation Partnership Project, Busan Korea, May 11, 2018.
"Considerations on Frame Structure for NR Unlicensed Operations", 3rd Generation Partnership Project, Busan Korea, May 11, 2018.
International Search Report (English and Chinese) and Written Opinion (Chinese) of the International Searching Authority issued in PCT/CN2019/089201, dated Aug. 20, 2019; ISA/CN.

* cited by examiner

```
┌─────────────────────────────────────────────────────────────┐
│ receiving a channel sharing information sent by a User      │  ⌐ S201
│ Equipment (UE), wherein the channel sharing information     │
│ comprises a slot format information of COT that is          │
│ available for a network to access and occupy an             │
│ unlicensed channel                                          │
└─────────────────────────────────────────────────────────────┘
                              │
┌─────────────────────────────────────────────────────────────┐
│    extracting the slot format information from the channel  │  ⌐ S202
│                    sharing information                      │
└─────────────────────────────────────────────────────────────┘
```

UNLICENSED CHANNEL SHARING METHOD AND DEVICE, STORAGE MEDIUM, TERMINAL AND BASE STATION

CROSS-REFERENCE TO RELATED APPLICATIONS

This application is a national phase of PCT International Application No. PCT/CN2019/089201, filed on May 30, 2019, which claims the benefit of priority to Chinese Patent Application No. 201810736266.0, filed on Jul. 6, 2018, and entitled "UNLICENSED CHANNEL SHARING METHOD AND DEVICE, STORAGE MEDIUM, TERMINAL AND BASE STATION", the entire disclosures of both of which are incorporated herein by reference.

TECHNICAL FIELD

The present disclosure generally relates to wireless communication technology field, and more particularly, to an unlicensed channel sharing method and device, a storage medium, a terminal and a base station.

BACKGROUND

The 3rd Generation Partnership Project (3GPP) standards organization will study how to deploy the Fifth-Generation mobile communications (abbreviated as 5G) New Radio (NR) system on an unlicensed spectrum, so as to achieve fair and effective use of the unlicensed spectrum and increase data transmission rate of the NR system. There are three main ways for the NR system to use the unlicensed spectrum. The first one is to use a NR cell of an unlicensed spectrum as a primary cell; the second one is a User Equipment (UE) accesses an unlicensed spectrum NR cell through a Long Term Evaluation (LTE) cell of a licensed spectrum; the third one is a UE accesses an unlicensed spectrum NR cell through a licensed spectrum NR cell. In the second and third methods, the UE and a NR base station (also known as gNB) or an evolved Node B (eNB) can simultaneously work on the licensed spectrum and the unlicensed spectrum through carrier aggregation technology.

The existing 3GPP LTE system uses the License Assisted Access (LAA) solution to communicate in the unlicensed spectrum. The LAA solution uses the Listen-Before-Talk (LBT) mechanism to realize the coexistence of different communication systems (for example, a LTE system and a Wi-Fi system) in the unlicensed spectrum. A basic principle of the LBT mechanism is: before transmitting data in the unlicensed spectrum, a node uses the Clear Channel Assessment (CCA) mechanism to determine whether a current channel is available, according to a result of Energy detection. Some regional laws and regulations set an energy detection threshold. If the energy received by the node is higher than the energy detection threshold, the channel is considered to be busy and unavailable.

The existing LTE system uses the LAA mechanism: if the base station successfully accesses the unlicensed channel, it can send a scheduling information to instruct the UE to send uplink data in a certain subframe; if the UE successfully accesses the unlicensed channel, it can notify the base station to send a downlink scheduling information on an Xth subframe.

However, in the 5G NR system, after the UE accesses the unlicensed channel successfully, a technical solution for the UE to notify the base station how long the unlicensed channel will be occupied is needed.

SUMMARY

Embodiments of the present disclosure provide a solution on how a UE effectively informs a base station of an unlicensed channel occupation time, so that the UE and the base station can share the unlicensed channels effectively, thereby improving system performance.

In an embodiment of the present disclosure, an unlicensed channel sharing method is provided, including: determining a channel sharing information, wherein the channel sharing information includes a slot format information of Channel Occupy Time (COT) that is available for a network to access and occupy an unlicensed channel; and sending the channel sharing information to the network.

Optionally, the slot format information includes a starting position information of the COT and a shared duration information of the COT; where the starting position information of the COT includes a starting slot index and a starting symbol index of a radio frame in which the COT is located; and the shared duration information of the COT includes a number of slots.

Optionally, the slot format information includes a starting position information of the COT and an ending position information of the COT; where the starting position information of the COT includes a starting slot index and a starting symbol index of a radio frame in which the COT is located; and the ending position information of the COT includes an ending slot index and an ending symbol index of a last radio frame in which the COT is located.

Optionally, the ending position information of the COT further includes an indication information about whether the COT spans more than two radio frames.

Optionally, the slot format information includes a slot deviation, where the slot deviation refers to a number of slots between a slot in which the channel sharing information is carried and a starting slot of the COT.

Optionally, before determining a channel sharing information, the unlicensed channel sharing method further includes: determining a total number of slots that access and occupy the unlicensed channel.

Optionally, determining a total number of slots that access and occupy the unlicensed channel includes: receiving a total slot configuration information of unlicensed serving cells sent by the network, so as to determine the total number of slots that access and occupy the unlicensed channel; or receiving a channel access priority information corresponding to each of at least one unlicensed serving cell sent by the network, and determining the total number of slots according to a number of each unlicensed serving cell and the corresponding channel access priority information.

Optionally, determining the total number of slots according to a number of each unlicensed serving cell and the corresponding channel access priority information includes: determining a maximum COT according to the channel access priority information corresponding to each unlicensed serving cell; determining a maximum number of slots according to the maximum COT; and determining a product of the number of each unlicensed serving cell and the maximum number of slots as the total number of slots.

Optionally, determining a channel sharing information comprises: using at least one Slot Format Indication (SFI) information to determine the channel sharing information, where the SFI information is used to indicate an occupancy status of each slot or symbol in a frame, and the occupancy status comprises: Uplink (UL) channel occupancy, Downlink (DL) channel occupancy, and UL/DL channel sharing.

Optionally, if a time length corresponding to the at least one SFI information is longer than a time length of the total number of slots, the occupancy status of an excess part is marked with a symbol that means UL/DL channel sharing.

Optionally, the unlicensed channel sharing method further includes: receiving a downlink signal sent by the network.

Optionally, sending the channel sharing information to the network includes: sending the channel sharing information according to an Uplink Control Information (UCI).

In an embodiment of the present disclosure, an unlicensed channel sharing method is provided, including: receiving a channel sharing information sent by a User Equipment (UE), wherein the channel sharing information includes a slot format information of Channel Occupy Time (COT) that is available for a network to access and occupy an unlicensed channel; and extracting the slot format information from the channel sharing information.

Optionally, the slot format information includes a starting position information of the COT and a shared duration information of the COT; where the starting position information of the COT includes a starting slot index and a starting symbol index of a radio frame in which the COT is located; and the shared duration information of the COT includes a number of slots.

Optionally, the slot format information includes a starting position information of the COT and an ending position information of the COT; where the starting position information of the COT includes a starting slot index and a starting symbol index of a radio frame in which the COT is located; and the ending position information of the COT includes an ending slot index and an ending symbol index of a last radio frame in which the COT is located.

Optionally, the ending position information of the COT further includes an indication information about whether the COT spans more than two radio frames.

Optionally, the slot format information comprises a slot deviation, where the slot deviation refers to a number of slots between a slot in which the channel sharing information is carried and a starting slot of the COT.

Optionally, before receiving the channel sharing information sent by the UE, the unlicensed channel sharing method further includes: sending a total slot configuration information of unlicensed serving cells to the UE; or sending a channel access priority information corresponding to each of at least one unlicensed serving cell to the UE, so that the UE determines a total number of slots according to a number of each unlicensed serving cell and the corresponding channel access priority information.

Optionally, the channel sharing information is determined by at least one Slot Format Indication (SFI) information, where the SFI information is used to indicate an occupancy status of each slot or symbol in a frame, and the occupancy status comprises: Uplink (UL) channel occupancy, Downlink (DL) channel occupancy, and UL/DL channel sharing.

Optionally, if a time length corresponding to the at least one SFI information is longer than a time length of the total number of slots, the occupancy status of an excess part is marked with a symbol that means UL/DL channel sharing.

Optionally, the unlicensed channel sharing method further includes: using short Listen-Before-Talk (LBT) mechanism to access the unlicensed channel, and sending a downlink signal to the UE.

Optionally, receiving a channel sharing information sent by a UE includes: receiving the channel sharing information sent by the UE according to an Uplink Control Information (UCI).

In an embodiment of the present disclosure, an unlicensed channel sharing device is provided, including: a first determining module, configured to determine a channel sharing information, wherein the channel sharing information comprises a slot format information of Channel Occupy Time (COT) that is available for a network to access and occupy an unlicensed channel; and a sending module, configured to send the channel sharing information to the network.

In an embodiment of the present disclosure, an unlicensed channel sharing device is provided, including: a receiving module, configured to receive a channel sharing information sent by a User Equipment (UE), wherein the channel sharing information includes a slot format information of Channel Occupy Time (COT) that is available for a network to access and occupy an unlicensed channel; and an extracting module, configured to extract the slot format information from the channel sharing information.

In an embodiment of the present disclosure, a storage medium having computer instructions stored therein is provided, wherein once the computer instructions are executed, the above unlicensed channel sharing method is performed.

In an embodiment of the present disclosure, a terminal including a memory and a processor is provided, wherein the memory has computer instructions stored therein, and when the processor executes the computer instructions, the above unlicensed channel sharing method is performed.

In an embodiment of the present disclosure, a base station including a memory and a processor is provided, wherein the memory has computer instructions stored therein, and when the processor executes the computer instructions, the above unlicensed channel sharing method is performed.

Embodiments of the present disclosure may provide following advantages.

In embodiments of the present disclosure, the unlicensed channel sharing method includes: determining a channel sharing information, wherein the channel sharing information comprises a slot format information of COT that is available for a network to access and occupy an unlicensed channel; and sending the channel sharing information to the network. By the embodiments of the present disclosure, the UE can effectively notify the base station of the slot format information (for example, slot and symbol information) of the unlicensed channel occupancy time, so that after the UE successfully occupies the unlicensed channel, the base station can share the unlicensed channel with the UE, thereby increasing the occupancy rate of the unlicensed channel and improving system performance.

Further, the slot format information includes a starting position information of the COT and a shared duration information of the COT; where the starting position information of the COT includes a starting slot index and a starting symbol index of a radio frame in which the COT is located; and the shared duration information of the COT includes a number of slots. By the embodiments of the present disclosure, the UE can inform the base station about the starting/ending slots and starting/ending symbols of the unlicensed channel, which further facilitates the base station on the network side to share the unlicensed channel obtained by the UE.

Further, the at least one SFI information is used to determine the channel sharing information, where the SFI information is used to indicate an occupancy status of each slot or symbol in a frame, and the occupancy status comprises: Uplink (UL) channel occupancy, Downlink (DL) channel occupancy, and UL/DL channel sharing. By the embodiments of the present disclosure, the base station on the network side can further clarify the unlicensed channel occupation time that is occupied by the UE, which further improves the efficiency of unlicensed channels.

DETAILED DESCRIPTION

As described in background, in the 5G NR system, a technical solution for a UE to notify a base station of an unlicensed channel occupation duration is needed.

Figure 1:
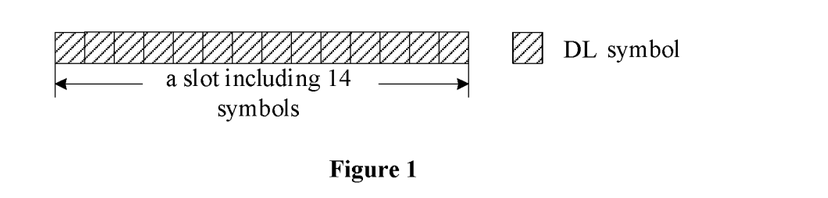
FIGS. 1 to 5 are schematic configuration diagrams of a single slot format in prior art.

Inventors of the present disclosure found that a frame structure of a NR system is shown in FIG. 1, wherein in a wireless frame with a time domain length of 10 ms, each wireless frame can be divided into 10 subframes with a length of 1 ms; each subframe may include multiple slots; and each slot may include a certain number of symbols, and the number of symbols is determined by a type of cyclic prefix (CP).

Compared with a subframe structure of the LTE system, the NR system introduces Slot Format (SF), which includes downlink (DL) symbols, uplink (UL) symbols and flexible symbols (which can be uplink symbols or downlink symbols). The SF may include three configuration methods: (1) semi-static cell-level Radio Resource Control (RRC) signaling configuration; (2) UE-specific RRC signaling configuration; (3) using a Physical Downlink Control Channel (PDCCH) to send a dynamic slot format indication (SFI) information.

The SFI information carried by the PDCCH may indicate a single slot format on one or more carriers or multiple slot formats on one or more carriers. After the SFI is monitored, a UE may obtain an index information pointing to a UE-specific table that shows which symbols in a slot are uplink symbols, which symbols are downlink symbols, and which symbols are flexible symbols. In addition, the uplink symbols are represented by "U", which indicates that the uplink symbols are used to transmit uplink data; the downlink symbols are represented by "D", which indicates that the downlink symbols are used to transmit downlink data; the flexible symbols are represented by "X", which indicates that the flexible symbols can be used to transmit uplink data or downlink data.

TABLE 1

Symbols included in each slot

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | U | D | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | X | X | U | D | D | D | X | X | U | | |
| 50 | D | D | X | X | U | U | D | D | X | X | U | U | U | U |
| 51 | D | X | X | U | U | U | D | X | X | U | U | U | U | U |
| 52 | D | X | X | X | X | U | D | X | X | X | X | U | U | U |
| 53 | D | D | X | X | X | U | D | D | X | X | X | U | U | U |
| 54 | X | X | X | X | X | X | D | D | D | D | D | D | D | D |
| 55 | D | D | X | X | U | U | U | D | D | D | D | D | D | D |
| 56-255 | Reserved | | | | | | | | | | | | | |

Further, the UE-specific table may be configured by a "single slot format" table or a combination of "single slot format". The "single slot format" table includes all the slot formats that can be supported in NR (for example, 255 slot formats are supported). Table 1 lists a "single slot format" table that is determined currently, in which each slot may include two downlink/uplink switching points at most.

Figure 2:
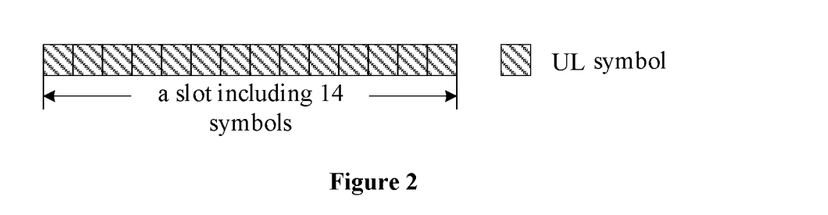
Figure 3:
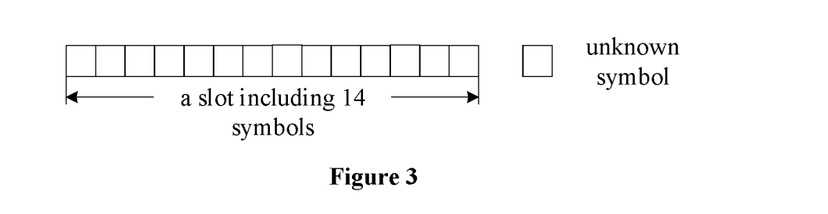
Figure 4:
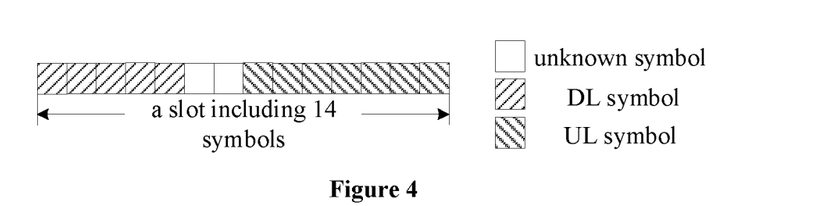
Figure 5:
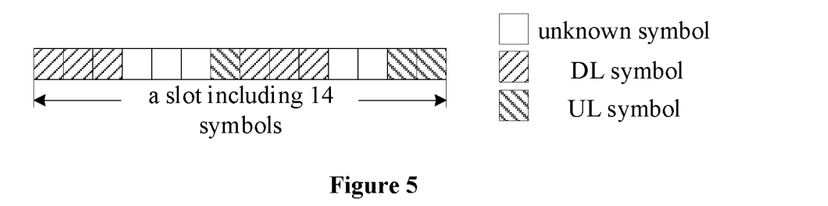

In the "single slot format", there may be no switching point in each slot: as shown in FIG. 1, all symbols are downlink symbols (for example, 14 downlink symbols); as shown in FIG. 2, all symbols are uplink symbols (for example, 14 uplink symbols); as shown in FIG. 3, all symbols are unknown symbols (for example, 14 unknown symbols). Or, each slot may include one downlink/uplink (D/U) switching point: as shown in FIG. 4, the slot starts with 0 or more DL symbols, ends with 0 or more UL symbols, has some unknown symbols in the middle, and includes at least one unknown symbol and one DL symbol or one UL symbol. Or, each slot includes two D/U switching points: as shown in FIG. 5, the first 7 symbols of the slot start with 0 or more DL symbols, end with at least 1 UL symbol in Symbol 6, and has some unknown symbols in the middle; the last 7 symbols of the slot start with 0 or more DL symbols, end with 0 or more UL symbols, and has 0 or more unknown symbols in the middle.

At present, LTE LAA downlink transmission supports two channel access processes: one is for sending Physical Downlink Shared Channel (PDSCH), PDCCH/Enhanced PDCCH (EPDCCH) (which is also called Category 4 (Cat 4) channel access), and the other one is for sending discovery reference signals (which is also called category 2 (Cat 2) channel access). LAA uplink transmission also supports two channel access processes: Type 1 channel access and Type 2 channel access, where Type 1 channel access is based on Cat 4 channel access, and Type 2 channel access is based on Cat 2 channel access.

Specifically, Type 1 channel access process is a random backoff LBT process with a non-fixed length competition window, which may include the following steps: (1) when a channel is monitored, a backoff timer N can be initialized if the channel is idle within a defer duration; (2) $N=N_{init}$, and $N_{init}$ is a random number between 0 and $CW_p$; (3) If $N>0$ and a base station decreases a counter value, then $N=N-1$; otherwise if $N=0$, stop counting Or stop counting when the channel is busy.

Specifically, if Type1 channel access process is used, different Maximum Channel Occupy Time (MCOT) can be used according to different channel access priorities. As shown in Table 2, $T_{mcot,p}$ represents the maximum occupied channel time, in milliseconds.

TABLE 2

| Channel access priority category (p) | $m_p$ | $CW_{min,p}$ | $CW_{max,p}$ | $T_{mcot,p}$ (ms) | Allowable range of CWp |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Type 2 channel access process is a random backoff LBT with a fixed-length competition window. It is required to detect that the channel idle time is at least 25 microseconds (μs), the average energy is lower than the energy threshold, and the transmission time is less than 1 ms, then downlink or uplink data transmission can be performed on a channel transmitted by an unlicensed cell.

In LTE LAA, after successfully accessing an unlicensed channel with Type 1 channel access process, a base station can send a scheduling information to instruct a UE to send a physical uplink shared channel (PUSCH) or a Sounding Reference Signal (SRS). If a time difference with a downlink transmission is less than 16 μs, the UE can perform uplink channel access with Type 2 channel access process. After successfully accessing the unlicensed channel with Type 1 channel access process, the UE can notify the base station to send a downlink scheduling information in a subsequent Xth subframe. However, in the NR system, due to the change of slot length, it is difficult to notify the base station of channel occupation duration with a method similar to LTE LAA; as a result, the channel cannot be effectively shared with the base station.

In order to solve the problems described above, an unlicensed channel sharing method is provided in embodiments of the present disclosure. The unlicensed channel sharing method includes: determining a channel sharing information, wherein the channel sharing information comprises a slot format information of Channel Occupy Time (COT) that is available for a network to access and occupy an unlicensed channel; sending the channel sharing information to the network. By embodiments of the present disclosure, a UE can effectively notify a base station of the slot format information (for example, slot and symbol information) of the unlicensed channel occupation duration, so that after the UE successfully occupies the unlicensed channel, the base station can share channels with the UE, thereby increasing occupancy rate of the unlicensed channel and improving system performance.

In order to clarify the object, characteristic and advantages of embodiments of the present disclosure, embodiments of present disclosure will be described clearly in detail in conjunction with accompanying drawings.

Figure 6:
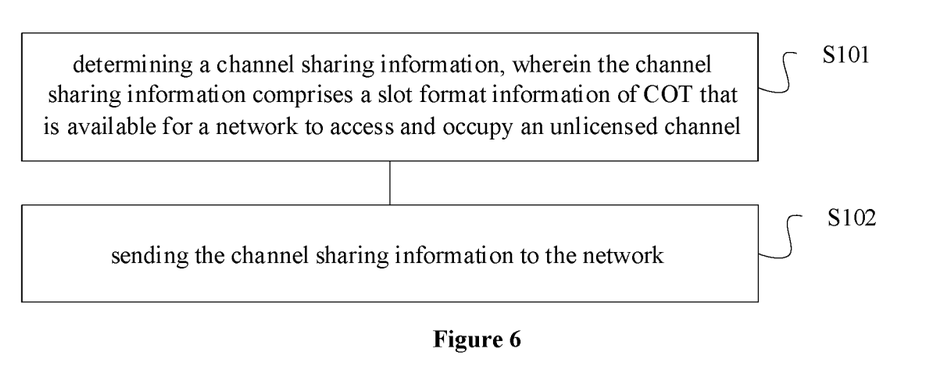
FIG. 6 schematically shows a flow chart of an unlicensed channel sharing method according to an embodiment of the present disclosure.

FIG. 6 schematically shows a flow chart of an unlicensed channel sharing method according to an embodiment of the present disclosure. Referring to FIG. 6, the unlicensed channel sharing method includes S101 and S102.

In S101, a channel sharing information is determined, where the channel sharing information includes a slot format information of Channel Occupy Time (COT) available for a network to access and occupy an unlicensed channel;

In S102, the channel sharing information is sent to the network.

Specifically, a UE may access the unlicensed channel based on Type 1 channel access process according to the network configuration. More specifically, before accessing the unlicensed channel, the UE may receive one or more unlicensed serving cell information from the network, such as unlicensed channel configuration information. Further, the UE may also receive channel access priority information of each unlicensed serving cell from the network. Thereafter, the UE may try to access the unlicensed channel based on the Type 1 channel access process.

In S101, if the UE accesses the unlicensed channel successfully, the channel sharing information may be determined, so that the network and the UE can share the unlicensed channel. Specifically, the channel sharing information may include the slot format information of COT that is available for the network to access and occupy the unlicensed channel, such as a slot index and a symbol index.

In some embodiments, the slot format information may include a starting position information of the COT and a shared duration information of the COT. For example, the slot format information may include a starting position information of the COT and a shared duration information of the COT that can be shared by a base station on the network side. Further, the starting position information of the COT may include a slot index and a symbol index of a radio frame in which the COT is sent (that is, a starting slot index and a starting symbol index of the COT); the shared duration information of the COT may include a number of slots.

Taking a 15 KHz subcarrier interval as an example, the slot format information may use 4 bits to represent the starting slot index of the COT, and use 4 bits to represent the starting symbol index of the COT. Taking a 30 KHz subcarrier interval as an example, the slot format information may use 5 bits to represent the starting slot index of the COT, and use 4 bits to represent the starting symbol index of the COT. Those skilled in the art can understand that other subcarrier intervals having different bandwidths can also be used, which will not be repeated in detail here.

In some embodiments, the slot format information may include a starting position information of the COT and an ending position information of the COT. For example, the slot format information may include a starting position information of the COT and an ending position information of the COT that can be shared by a base station on the network side. Further, the starting position information of the COT may include a slot index and a symbol index of a radio frame in which the COT is sent (that is, a starting slot index and a starting symbol index of the COT); the ending position information of the COT may include an ending slot index and an ending symbol index of a last radio frame in which the COT is located, where the last radio frame may be a radio frame that transmits the channel sharing information, or may be a next frame adjacent to the radio frame that transmits the COT.

Taking a 15 KHz subcarrier interval as an example, the slot format information may use 4 bits to represent the starting slot index of the COT, and use 4 bits to represent the starting symbol index of the COT; and the slot format information may use 4 bits to represent the ending slot index of the COT, and use 4 bits to represent the ending symbol index of the COT. Taking a 30 KHz subcarrier interval as an example, the slot format information may use 5 bits to represent the starting slot index of the COT, and use 4 bits to represent the starting symbol index of the COT; and the slot format information may use 5 bits to represent the ending slot index of the COT, and use 4 bits to represent the ending symbol index of the COT. Those skilled in the art can understand that other subcarrier intervals having different bandwidths can also be used, which will not be repeated in detail here.

Further, in addition to the starting position information of the COT and the ending position information of the COT, the slot format information may also include an indication information about whether the COT spans more than two radio frames. For example, 1 bit may be used to indicate that the ending position information is a current radio frame for transmitting the channel sharing information. Those skilled in the art can understand that the channel sharing information may not include the indication information. In this case, the network can determine whether the ending position information is the current radio frame for sending the channel sharing information or a next radio frame, according to a slot information (for example, a slot identifier).

In some embodiments, the slot format information may include a slot deviation. The slot deviation refers to a number of slots between a slot in which the channel sharing information is carried and a starting slot of the COT. In some embodiments, assuming that the slot deviation is M, the network can access the unlicensed channel to transmit downlink data after receiving the shared channel information and M time slots thereafter. Those skilled in the art can understand that the network and the UE may make an agreement in advance that after the network receives the slot deviation M, N time slots which are starting from the Mth slot can be used as channel sharing slots to transmit downlink data, where M and N are both positive integers.

Further, the UE may determine a maximum COT according to the channel access priority information, and determine a maximum number of slots according to the maximum COT.

Taking Table 2 as an example, when the channel access priority category is 1, the maximum COT is 2 ms; when the channel access priority category is 3, the maximum COT is 8 ms or 10 ms. Afterwards, a total number of slots may be obtained according to the number of accessed unlicensed serving cells that need to be fed back and the maximum COT. For example, the number of unlicensed serving cells may be multiplied by the maximum COT, and a multiplication result may be used as the total number of slots. In some embodiments, when the UE accesses the unlicensed serving cell according to the Type 1 channel access process, the maximum COT depends on the channel access priority category. Assuming that the total number of slots is U, the number of unlicensed serving cells is K, and the number of slots corresponding to the maximum COT is J, then U=K×J. For example, if the number of unlicensed serving cells is 2 and the maximum COT is 4 ms which is corresponding to 8 slots of a 30 KHz subcarrier, then U=8×2=16.

In some embodiments, the base station on the network side may configure for the UE the total number of slots of the unlicensed serving cells for which the channel sharing information needs to be fed back. The UE may obtain the total number of slots according to a total slot configuration information of the unlicensed serving cells sent by the network.

Thereafter, the UE may use one or more Slot Format Indication (SFI) information in an Uplink Control Information (UCI) to transmit the channel sharing information. The SFI information may be used to indicate an occupancy status of each slot or symbol in a single frame, for example, the occupancy status may be Uplink (UL) channel occupancy, or Downlink (DL) channel occupancy, or UL/DL channel sharing. The UL/DL channel sharing means that the base station on the network side can schedule as a UL channel or a DL channel.

In some embodiments, format 0 in Table 1 (for example, all D) can be used to indicate that all slots are occupied by the DL channel, that is, the base station on the network side can transmit downlink data on all the slots.

In some embodiments, format 1 in Table 1 can be used to indicate that all slots are occupied by the UL channel, that is, the base station on the network side can transmit uplink data on all the slots.

In some embodiments, If there is a switching point (for example, format 19 to format 45 (D+X+U) in Table 1 or format 8 to format 15 (X+U) in Table 1), the SFI information may indicate that the UE occupies the unlicensed channel corresponding to all slots, and the UE may send uplink data in an uplink channel indicated by "U". The base station on the network side may send downlink data in a downlink channel indicated by "D". The flexible symbol "X" indicates a channel that may be scheduled by the base station on the network side as a UL channel or a downlink channel to send downlink data or uplink data. It should be noted that the flexible symbol "X" may also indicate a switching gap between UL and DL.

In some embodiments, if there are two switching points (for example, format 46 to format 55 in Table 1), the SFI information may indicate that the UE occupies the unlicensed channel corresponding to all slots, and the UE may send uplink data in an uplink channel indicated by "U". The base station on the network side may send downlink data in a downlink channel indicated by "D". The flexible indicator "X" indicates a channel that may be scheduled by the base station on the network side to send downlink data or uplink data.

Further, the UCI may indicate that a time length corresponding to the SFI information of the corresponding unlicensed serving cell is longer than the maximum COT time. Therefore, the SFI information may be used to indicate UL channel occupancy, DL channel sharing, and exceeding the maximum COT time or channel release. Further, if the time length corresponding to the SFI information is longer than a time length of the total number of slots, the occupancy status of an excess part may be marked as channel release or exceeding the maximum COT time.

Specifically, the indicator U in the SFI information may be used to indicate a slot or a symbol occupied by an UL channel, the indicator D indicates a slot or a symbol shared by a DL channel, and the indicator X indicates a symbol available for uplink and downlink scheduling. Further, if the total number of slots is greater than the maximum COT, the indicator X may be used to indicate a slot or symbol that exceeds the channel occupation. In this case, the occupancy status of an excess part is marked with a symbol that means UL/DL channel sharing.

It should be noted that, if the UCI is used to indicate the SFI of multiple unlicensed serving cells, and if there are unlicensed serving cells that have not been accessed successfully, the UE may use a specific slot format to indicate no channel occupancy, excess channel occupancy or channel release. Specifically, if the indicators U, D, and X in the SFI information all represent slot information, and when all slots are indicated by the indicator X, or the last one or more slots are indicated by the indicator X, then the indicator X can be used to indicate a slot of excess channel occupancy. If the indicators U, D, and X in the SFI information all represent symbol information, and when the last one or more symbols are indicated by the indicator X, then the indicator X can be used to indicate a symbol of excess channel occupancy. Neither the UE nor the network can transmit data on slots or symbols that are indicated as no channel occupancy, excess channel occupancy or channel release.

In some embodiments, all X (format 2 in Table 1) may be used to indicate that the UE failed to access a corresponding unlicensed serving cell, that is, all the slots are excess channel occupancy or the channel has been released by the UE. In another example, format 3 to format7, format16, format17, format18 (DL+X) in Table 1 may be used to indicate that some slots are excess channel occupancy or channel release.

Figure 7:
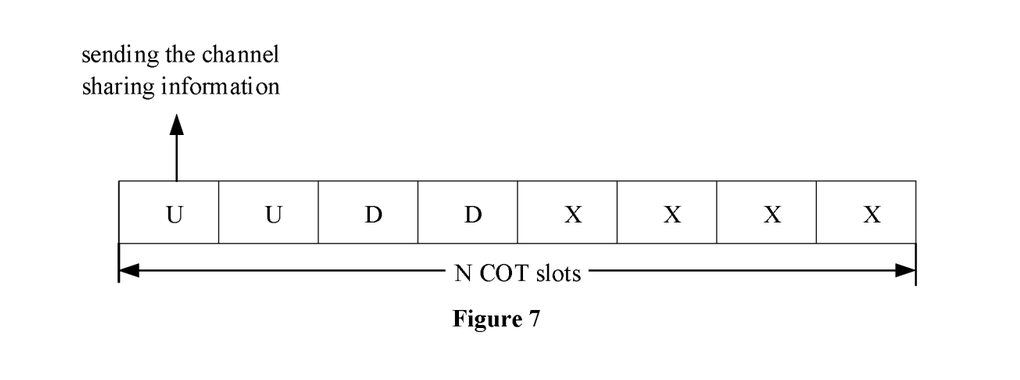
FIG. 7 is a schematic diagram of a slot index corresponding to a SFI information in an unlicensed channel sharing method according to an embodiment of the present disclosure.

Referring to FIG. 7, the UE may indicate N slot information of the COT to the base station on the network side through the SFI information. In the N slot information of the COT, if a slot format corresponding to an i-th slot format index is "D", the i-th slot may be used to send downlink data; if the i-th slot format corresponding to the i-th slot format index is "U", the i-th slot may be used to send uplink data; if the slot format corresponding to the i-th slot format index is "X", there are two cases. In a first case, if there is no valid "D" or "U" after the indicator "X", it means excess channel occupancy or channel release, and channel sharing cannot be performed; if there is a valid DL or UL symbol after the indicator "X", it means the channel can be scheduled by the base station on the network side to send downlink data or uplink data. It should be noted that the indicator "X" can also be used as a switching gap between uplink and downlink.

Figure 8:
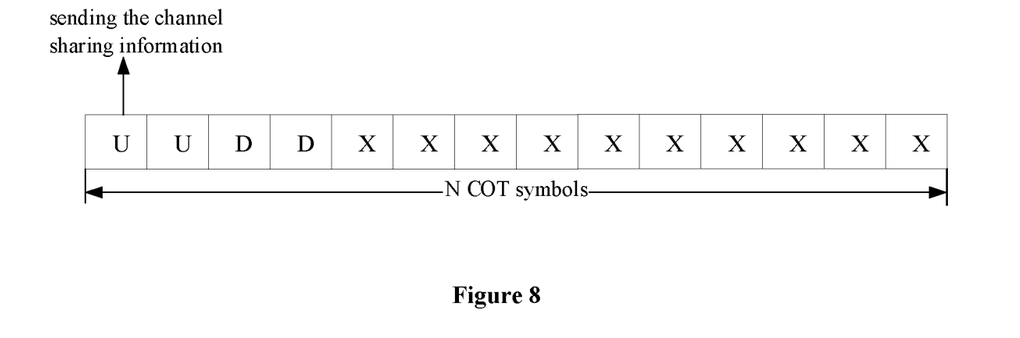
FIG. 8 is a schematic diagram of a symbol index corresponding to a SFI information in an unlicensed channel sharing method according to an embodiment of the present disclosure.

Referring to FIG. 8, the UE may indicate N symbol information of the COT to the base station on the network side through the SFI information. In the N symbol information of the COT, if a symbol format corresponding to an i-th symbol format index is "D", the i-th symbol may be used to send downlink data; if the i-th symbol format corresponding to the i-th symbol format index is "U", the i-th symbol may be used to send uplink data; if the symbol format corresponding to the i-th symbol format index is "X", there are two cases. In a first case, if there is no valid "D" or "U" after the indicator "X", it means excess channel occupancy or channel release, and channel sharing cannot be performed; if there is a valid DL or UL symbol after the indicator "X", it means the channel can be scheduled by the base station on the network side to send downlink data or uplink data. It should be noted that the indicator "X" can also be used as a switching gap between uplink and downlink.

Further, after receiving the channel sharing information, the network may obtain a channel occupation time and a channel release information (for example, channel release point) according to the channel sharing information, and obtain channel occupation duration. During the channel occupation time, the network may allocate information for downlink symbols and uplink symbols in each slot. Further, in downlink symbols indicating the slot format, the network may use the short LBT mechanism (for example, Type2 channel access process) to access the unlicensed channel and send the downlink data.

In some embodiments, the network may not perform LBT and directly send downlink signal on the unlicensed channel, where the downlink signal may be a periodic signal, for example, a periodic Channel State Information Reference Signal (CSI-RS), a PDCCH signal; or the downlink signal may be a non-periodic downlink signal configured by a high-level signaling.

Further, in the uplink symbols and flexible symbols indicating the slot format, the network may directly use the short LBT mechanism to access the unlicensed channel, or directly send a dynamic downlink signal triggered by a physical layer signaling, for example, a non-periodic CSI-RS Signal.

Thereafter, the UE may receive the downlink signal sent by the network for data transmission.

Figure 9:
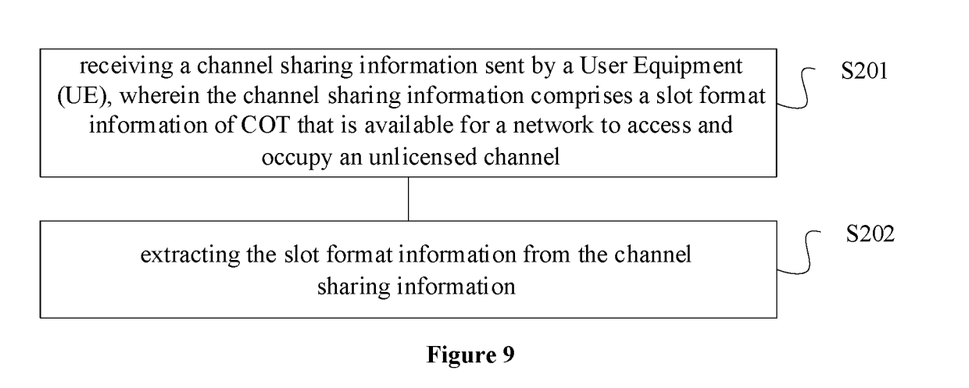
FIG. 9 schematically shows a flow chart of an unlicensed channel sharing method according to another embodiment of the present disclosure.

FIG. 9 schematically shows a flow chart of an unlicensed channel sharing method according to another embodiment of the present disclosure. The unlicensed channel sharing method is adapted to be used on a network side, for example, the method may be performed by a base station on the network side. Referring to FIG. 9, the unlicensed channel sharing method includes S201 and S202.

In S201, a channel sharing information sent by a User Equipment (UE) is received, where the channel sharing information includes a slot format information of Channel Occupy Time (COT) that is available for a network to access and occupy an unlicensed channel.

In S202, the slot format information is extracted from the channel sharing information.

Specifically, the network may send a total slot configuration information of unlicensed serving cells to the UE; or, the network may send a channel access priority information corresponding to each of at least one unlicensed serving cell to the UE, so that the UE can determine a total number of slots according to a number of each unlicensed serving cell and the corresponding channel access priority information.

In S201, the network may send may receive the channel sharing information sent by the UE according to an Uplink Control Information (UCI), where the channel sharing information includes the slot format information of COT that is available for the network to access and occupy the unlicensed channel.

In some embodiments, the slot format information includes a starting position information of the COT and a shared duration information of the COT; where the starting position information of the COT comprises a starting slot index and a starting symbol index of a radio frame in which the COT is located; and the shared duration information of the COT includes a number of slots.

In some embodiments, the slot format information includes a starting position information of the COT and an ending position information of the COT; where the starting position information of the COT includes a starting slot index and a starting symbol index of a radio frame in which the COT is located; and the ending position information of the COT includes an ending slot index and an ending symbol index of a last radio frame in which the COT is located.

In some embodiments, in addition to the starting position information of the COT and the ending position information of the COT, the ending position information of the COT further includes an indication information about whether the COT spans more than two radio frames.

In some embodiments, the slot format information includes a slot deviation, where the slot deviation refers to a number of slots between a slot in which the channel sharing information is carried and a starting slot of the COT.

Further, the channel sharing information is determined by at least one Slot Format Indication (SFI) information, where the SFI information is used to indicate an occupancy status of each slot or symbol in a frame, and the occupancy status comprises: Uplink (UL) channel occupancy, Downlink (DL) channel occupancy, and UL/DL channel sharing.

Further, if a time length corresponding to the at least one SFI information is longer than a time length of the total number of slots, the occupancy status of an excess part is marked with a symbol that means UL/DL channel sharing.

Thereafter, the network may extract the slot format information from the channel sharing information. If the channel sharing information includes a downlink channel occupancy status, the network may access the unlicensed channel by using the short LBT mechanism or not using the LBT mechanism, and send a downlink signal to the UE.

Those skilled in the art can understand that the steps S201 to S202 are corresponding to the steps S101 to S102 in the embodiments shown in FIG. 6, and the two groups are complementary in terms of specific implementation principles. Therefore, for the unlicensed channel sharing method on the network side, detailed description may refer to the embodiments shown in FIG. 6 to FIG. 8, which will not be repeated in detail here.

In summary, according to the unlicensed channel sharing methods provided in the embodiments of the present disclosure, the UE can inform the base station on the network side which unlicensed channels are available for the network to transmit downlink data, thereby increasing occupancy rate of the unlicensed channels and improving system performance.

Figure 10:
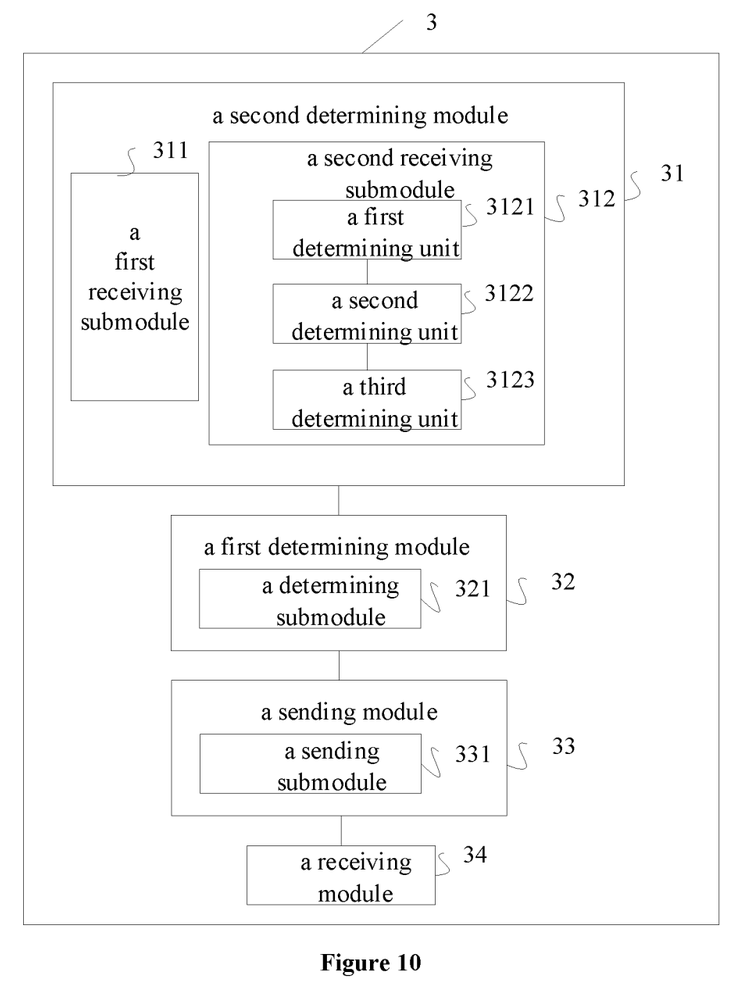
FIG. 10 schematically shows a structural diagram of an unlicensed channel sharing device according to an embodiment of the present disclosure.

FIG. 10 schematically shows a structural diagram of an unlicensed channel sharing device according to an embodiment of the present disclosure. Referring to FIG. 10, an unlicensed channel sharing device 3 (hereinafter referred to as a sharing device 3) may be applied to a user equipment (UE) to implement the method and technical solutions of the embodiments shown in FIGS. 6 to 8.

Specifically, the sharing device 3 includes: a first determining module 32 and a sending module 33. The first determining module 32 is configured to determine a channel sharing information, wherein the channel sharing information comprises a slot format information of Channel Occupy Time (COT) that is available for a network to access and occupy an unlicensed channel. And the sending module 33 is configured to send the channel sharing information to the network.

In one embodiment, the sending module 33 includes a sending submodule 331 which is configured to send the channel sharing information according to an Uplink Control Information (UCI).

In one embodiment, the slot format information includes a starting position information of the COT and a shared duration information of the COT, where the starting position information of the COT includes a starting slot index and a starting symbol index of a radio frame in which the COT is located; and the shared duration information of the COT includes a number of slots.

In one embodiment, the slot format information includes a starting position information of the COT and an ending position information of the COT, where the starting position information of the COT includes a starting slot index and a starting symbol index of a radio frame in which the COT is located, and the ending position information of the COT includes an ending slot index and an ending symbol index of a last radio frame in which the COT is located. In one embodiment, the ending position information of the COT further includes an indication information about whether the COT spans more than two radio frames.

In one embodiment, the slot format information includes a slot deviation, where the slot deviation refers to a number of slots between a slot in which the channel sharing information is carried and a starting slot of the COT.

In one embodiment, the first determining module 32 includes a determining submodule 321, which is configured to use at least one Slot Format Indication (SFI) information to determine the channel sharing information, where the SFI information is used to indicate an occupancy status of each slot or symbol in a frame, and the occupancy status comprises: Uplink (UL) channel occupancy, Downlink (DL) channel occupancy, and UL/DL channel sharing.

Further, if a time length corresponding to the at least one SFI information is longer than a time length of the total number of slots, the occupancy status of an excess part is marked with a symbol that means UL/DL channel sharing.

In one embodiment, the sharing device 3 further includes: a second determining module 31, which is configured to determine a total number of slots that access and occupy the unlicensed channel before determining the channel sharing information.

In one embodiment, the second determining module 31 includes: a first receiving submodule 311, configured to receive a total slot configuration information of unlicensed serving cells sent by the network, so as to determine the total number of slots that access and occupy the unlicensed channel; or a second receiving submodule 312, configured to receive a channel access priority information corresponding to each of at least one unlicensed serving cell sent by the network, and configured to determine the total number of slots according to a number of each unlicensed serving cell and the corresponding channel access priority information.

In one embodiment, the second receiving submodule 312 includes: a first determining unit 3121, configured to determine a maximum COT according to the channel access priority information corresponding to each unlicensed serving cell; a second determining unit 3122, configured to determine a maximum number of slots according to the maximum COT; a third determining unit 3123, configured to determine a product of the number of each unlicensed serving cell and the maximum number of slots as the total number of slots.

In one embodiment, the sharing device 3 further includes: a receiving module 34, configured to receive a downlink signal sent by the network.

Detailed description about the working principles of the sharing device 3 may refer to the corresponding descriptions about the embodiments in conjunction with FIGS. 6 to 8, which will not be repeated here.

Figure 11:
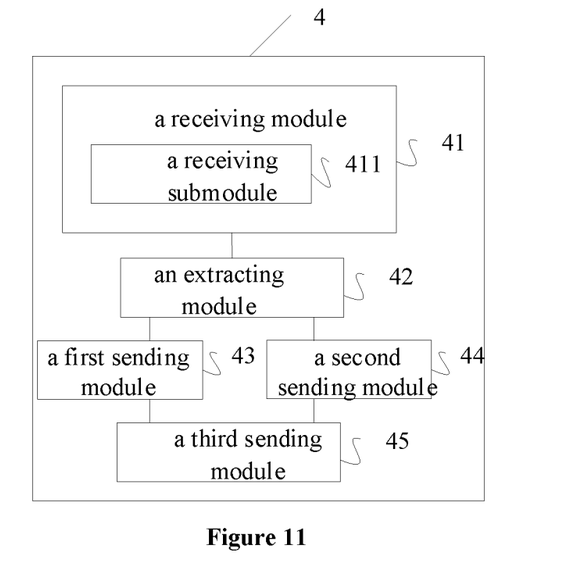
FIG. 11 schematically shows a structural diagram of an unlicensed channel sharing device according to another embodiment of the present disclosure.

FIG. 11 schematically shows a structural diagram of an unlicensed channel sharing device according to another embodiment of the present disclosure. Referring to FIG. 11, an unlicensed channel sharing device 4 (hereinafter referred to as a sharing device 4) may be applied to a base station on a network side to implement the technical solutions of the embodiments shown in FIGS. 7, 8 and 9.

Specifically, the sharing device 4 includes: a receiving module 41 and an extracting module 42.

In one embodiment, the receiving module 41 is configured to receive a channel sharing information sent by a User Equipment (UE), wherein the channel sharing information includes a slot format information of Channel Occupy Time (COT) that is available for a network to access and occupy an unlicensed channel. And the extracting module 42 is configured to extract the slot format information from the channel sharing information.

In one embodiment, the receiving module 41 includes a receiving submodule 411, which is configured to receive the channel sharing information sent by the UE according to an Uplink Control Information (UCI).

In one embodiment, the slot format information includes a starting position information of the COT and a shared duration information of the COT, where the starting position information of the COT includes a starting slot index and a starting symbol index of a radio frame in which the COT is located; and the shared duration information of the COT includes a number of slots.

In one embodiment, the slot format information includes a starting position information of the COT and an ending position information of the COT, where the starting position information of the COT includes a starting slot index and a starting symbol index of a radio frame in which the COT is located, and the ending position information of the COT includes an ending slot index and an ending symbol index of a last radio frame in which the COT is located.

In one embodiment, the ending position information of the COT further includes an indication information about whether the COT spans more than two radio frames.

In one embodiment, the slot format information includes a slot deviation, where the slot deviation refers to a number of slots between a slot in which the channel sharing information is carried and a starting slot of the COT.

In one embodiment, the sharing device 4 further includes: a first sending module 43, configured to send a total slot configuration information of unlicensed serving cells to the UE before the channel sharing information sent by the UE is received; or a second sending module 44, configured to send a channel access priority information corresponding to each of at least one unlicensed serving cell to the UE, so that the UE may determine a total number of slots according to a number of each unlicensed serving cell and the corresponding channel access priority information.

In one embodiment, the channel sharing information is determined by at least one Slot Format Indication (SFI) information, where the SFI information is used to indicate an occupancy status of each slot or symbol in a frame, and the occupancy status comprises: Uplink (UL) channel occupancy, Downlink (DL) channel occupancy, and UL/DL channel sharing.

Further, if a time length corresponding to the at least one SFI information is longer than a time length of the total number of slots, the occupancy status of an excess part is marked with a symbol that means UL/DL channel sharing.

In one embodiment, the sharing device 4 further includes: a third sending module 45, which is configured to use short Listen-Before-Talk (LBT) mechanism to access the unlicensed channel, and send a downlink signal to the UE.

Detailed description about the working principles of the sharing device 4 may refer to the corresponding descriptions about the embodiments in conjunction with FIGS. 7, 8 and 9, which will not be repeated here.

Signaling interactions between a user equipment and a network (for example, a NR base station) will be further described below in embodiments of the present disclosure and in conjunction with a typical application scenario.

Figure 12:
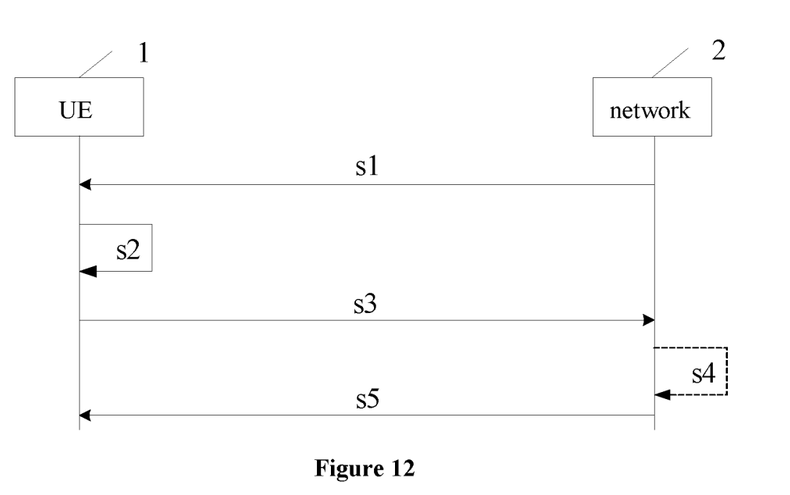
FIG. 12 is a schematic diagram of signaling interaction in a typical scenario in an embodiment of the present invention.

In a typical application scenario, referring to FIG. 12, after a user equipment (UE) 1 accesses a network 2, the UE 1 may try to access an unlicensed channel, and send the occupied unlicensed channel information to the network 2 through a channel sharing information. Specifically, the following steps may be included.

Firstly, the network 2 performs a step s1, in which the network 2 sends a configuration information to the UE 1. The configuration information may include an information related to unlicensed serving cells configured by the network 2 for the UE 1, and a channel access priority information corresponding to each unlicensed serving cell. Optionally, the configuration information may also include a total slot configuration information of the unlicensed serving cells.

Secondly, after receiving the configuration information, the UE 1 may perform a step s2, in which the UE 1 tries to access an unlicensed channel. If the unlicensed channel is successfully accessed, a channel sharing information may be determined, and the channel sharing information may include a slot format information of Channel Occupy Time (COT) that is available for the network to access and occupy the unlicensed channel.

Thirdly, the UE 1 may perform a step s3, in which the UE 1 sends the channel sharing information to the network 2.

At last, the network 2 may perform a step s4 before performing a step s5, in which the network 2 may access the unlicensed channel in a short LBT mechanism; after that, the network 2 performs the step s5, in which a downlink signal may be sent to the UE 1 for data transmission according to the channel sharing information.

Detailed descriptions on working principles of the UE 1 and the network 2 in the application scenario shown in FIG. 12 may refer to the corresponding descriptions about the embodiments in conjunction with FIGS. 6 to 9, which will not be repeated here.

In an embodiment of the present disclosure, a storage medium having computer instructions stored therein is provided, wherein when the computer instructions are executed, the above method as shown in FIGS. 6 to 9 is performed. The storage medium may be a computer readable storage medium, for example, including a non-volatile or non-transitory memory, an optical disk, a mechanical disk, a solid disk or the like.

In an embodiment of the present disclosure, a terminal including a memory and a processor is provided, wherein the memory has computer instructions stored therein, and when the processor executes the computer instructions, the above method as shown in FIGS. 6 to 8 is performed. Optionally, a base station may interact with a user equipment. Specifically, the terminal may be the user equipment (UE).

In an embodiment of the present disclosure, a base station including a memory and a processor is provided, wherein the memory has computer instructions stored therein, and when the processor executes the computer instructions, the above method as shown in FIGS. 7 to 9 is performed. Optionally, the base station may be a NR base station.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An unlicensed channel sharing method, comprising:
    determining a channel sharing information, wherein the channel sharing information comprises a slot format information of Channel Occupy Time (COT) that is available for a network to access and occupy an unlicensed channel; and
    sending the channel sharing information to the network;
    wherein the slot format information comprises a slot deviation, wherein the slot deviation refers to a number of slots between a slot in which the channel sharing information is carried and a starting slot of the COT.

2. The unlicensed channel sharing method according to claim 1, wherein the slot format information comprises a starting position information of the COT and a shared duration information of the COT;
    where the starting position information of the COT comprises a starting slot index and a starting symbol index of a radio frame in which the COT is located; and the shared duration information of the COT comprises a number of slots.

3. The unlicensed channel sharing method according to claim 1, wherein the slot format information comprises a starting position information of the COT and an ending position information of the COT;
    where the starting position information of the COT comprises a starting slot index and a starting symbol index of a radio frame in which the COT is located; and the ending position information of the COT comprises an ending slot index and an ending symbol index of a last radio frame in which the COT is located.

4. The unlicensed channel sharing method according to claim 3, wherein the ending position information of the COT further comprises an indication information about whether the COT spans more than two radio frames.

5. The unlicensed channel sharing method according to claim 1, wherein before determining a channel sharing information, the unlicensed channel sharing method further comprises: determining a total number of slots that access and occupy the unlicensed channel.

6. The unlicensed channel sharing method according to claim 5, wherein determining a total number of slots that access and occupy the unlicensed channel comprises:
    receiving a total slot configuration information of unlicensed serving cells sent by the network, so as to determine the total number of slots that access and occupy the unlicensed channel; or
    receiving a channel access priority information corresponding to each of at least one unlicensed serving cell sent by the network, and determining the total number of slots according to a number of each unlicensed serving cell and the corresponding channel access priority information.

7. The unlicensed channel sharing method according to claim 6, wherein determining the total number of slots according to a number of each unlicensed serving cell and the corresponding channel access priority information comprises:
    determining a maximum COT according to the channel access priority information corresponding to each unlicensed serving cell;
    determining a maximum number of slots according to the maximum COT; and
    determining a product of the number of each unlicensed serving cell and the maximum number of slots as the total number of slots.

8. The unlicensed channel sharing method according to claim 6, wherein determining a channel sharing information comprises: using at least one Slot Format Indication (SFI) information to determine the channel sharing information, where the SFI information is used to indicate an occupancy status of each slot or symbol in a frame, and the occupancy status comprises: Uplink (UL) channel occupancy, Downlink (DL) channel occupancy, and UL/DL channel sharing.

9. The unlicensed channel sharing method according to claim 8, wherein if a time length corresponding to the at least one SFI information is longer than a time length of the total number of slots, the occupancy status of an excess part is marked with a symbol that means UL/DL channel sharing.

10. The unlicensed channel sharing method according to claim 1, further comprising: receiving a downlink signal sent by the network.

11. An unlicensed channel sharing method, comprising:
    receiving a channel sharing information sent by a User Equipment (UE), wherein the channel sharing information comprises a slot format information of Channel Occupy Time (COT) that is available for a network to access and occupy an unlicensed channel; and
    extracting the slot format information from the channel sharing information;
    wherein the slot format information comprises a slot deviation, wherein the slot deviation refers to a number of slots between a slot in which the channel sharing information is carried and a starting slot of the COT.

12. The unlicensed channel sharing method according to claim 11, wherein the slot format information comprises a starting position information of the COT and a shared duration information of the COT;
    where the starting position information of the COT comprises a starting slot index and a starting symbol index of a radio frame in which the COT is located; and the shared duration information of the COT comprises a number of slots.

13. The unlicensed channel sharing method according to claim 11, wherein the slot format information comprises a starting position information of the COT and an ending position information of the COT;
    where the starting position information of the COT comprises a starting slot index and a starting symbol index of a radio frame in which the COT is located; and the ending position information of the COT comprises an ending slot index and an ending symbol index of a last radio frame in which the COT is located.

14. The unlicensed channel sharing method according to claim 13, wherein the ending position information of the COT further comprises an indication information about whether the COT spans more than two radio frames.

15. The unlicensed channel sharing method according to claim 11, wherein before receiving the channel sharing information sent by the UE, the unlicensed channel sharing method further comprises:
- sending a total slot configuration information of unlicensed serving cells to the UE; or
- sending a channel access priority information corresponding to each of at least one unlicensed serving cell to the UE, so that the UE determines a total number of slots according to a number of each unlicensed serving cell and the corresponding channel access priority information.

16. The unlicensed channel sharing method according to claim 15, wherein the channel sharing information is determined by at least one Slot Format Indication (SFI) information, where the SFI information is used to indicate an occupancy status of each slot or symbol in a frame, and the occupancy status comprises: Uplink (UL) channel occupancy, Downlink (DL) channel occupancy, and UL/DL channel sharing.

17. The unlicensed channel sharing method according to claim 16, wherein if a time length corresponding to the at least one SFI information is longer than a time length of the total number of slots, the occupancy status of an excess part is marked with a symbol that means UL/DL channel sharing.

18. A storage medium storing one or more programs, the one or more programs comprising computer instructions, which, when executed by a processor, cause the processor to:
- determine a channel sharing information, wherein the channel sharing information comprises a slot format information of Channel Occupy Time (COT) that is available for a network to access and occupy an unlicensed channel; and
- send the channel sharing information to the network;
- wherein the slot format information comprises a slot deviation, wherein the slot deviation refers to a number of slots between a slot in which the channel sharing information is carried and a starting slot of the CO.

* * * * *